United States Patent

[11] 3,572,463

[72] Inventor Rodney Eschenburg
San Diego, Calif.
[21] Appl. No. 818,594
[22] Filed Apr. 23, 1969
[45] Patented Mar. 30, 1971
[73] Assignee Rohr Corporation
Chula Vista, Calif.

[54] METHOD AND APPARATUS FOR SUPPRESSING THE NOISE OF AN AIRCRAFT JET ENGINE
4 Claims, 4 Drawing Figs.
[52] U.S. Cl. ................................................ 181/51,
181/60, 239/127.3, 239/265.17
[51] Int. Cl. ................................................ B64d 33/06,
F01n 1/14
[50] Field of Search .......................................... 181/43, 51,
33.22, 33.221, 33.222, 33, 35, 60; 239/265.11,
265.13, 265.17, 127.3

[56] References Cited
UNITED STATES PATENTS
2,648,192  8/1953  Lee ........................... 181/33(.222)
3,139,153  6/1964  DeRemer .................. 181/33(.221)
3,393,518  7/1968  Bridge ....................... 181/33(.221)
3,495,682  2/1970  Treiber ...................... 181/60X FOREIGN PATENTS
1,200,477  6/1959  France ....................... 181/51

Primary Examiner—Robert S. Ward, Jr.
Attorney—George E. Pearson

ABSTRACT: A thrust housing is mounted on an aircraft jet engine nacelle and has a plurality of nozzles at the aft end thereof. A cowling is fitted in spaced relation around the thrust housing and at its aft end is formed with a plurality of ejector tubes which are respectively disposed in spaced relation around the nozzles of said thrust housing. The cowling is mounted on the nacelle so that it can be moved to a first position wherein the forward end of the cowling abuts the nacelle and atmospheric air flowing along the nacelle is excluded from the interior of the cowling, or to a second position wherein the forward end thereof is spaced from the nacelle and atmospheric air enters the interior of the cowling and flows out of the aforesaid ejector tubes in annular streams respectively surrounding exhaust gas streams discharged through the nozzles of the thrust housing.

INVENTOR.
BY RODNEY ESCHENBURG
Edwin D. Grant
ATTORNEY

Patented March 30, 1971 3,572,463

INVENTOR.

BY RODNEY ESCHENBURG

Edwin D. Grant

ATTORNEY

INVENTOR.
BY RODNEY ESCHENBURG
Edwin D. Grant
ATTORNEY 3,572,463

METHOD AND APPARATUS FOR SUPPRESSING THE NOISE OF AN AIRCRAFT JET ENGINE

BACKGROUND OF THE INVENTION

This invention relates to jet-propelled aircraft and more particularly to a method and apparatus for suppressing the noise of such aircraft.

A considerable portion of the objectionable noise of jet-propelled airplanes is associated with the high velocity jet streams which issue from their engine nacelles. In accordance with this invention annular streams of atmospheric air are caused to flow around a plurality of jet streams issuing from each engine nacelle of a jet-propelled aircraft. These streams of atmospheric air effectively reduce the perceived noise level at ground level within an area lying under the flight path of the aircraft, without adversely affecting the operation of said aircraft.

SUMMARY OF THE INVENTION

Apparatus in accordance with this invention preferably comprises a thrust housing the forward end of which is fixedly attached to the aft end of an aircraft jet engine pod or nacelle so that thrust gas discharged from the engine enclosed within the latter enters the interior of the housing. The aft end of the thrust housing is formed with multiple nozzles through which the thrust gas flows to the atmosphere in the form of separate jet streams. A plurality of elongate support members are fixedly connected at one end thereof to the aft end of the nacelle and project rearwardly from the latter in parallel relation with the longitudinal axis of the thrust housing, the support members being evenly spaced apart circumferentially of the nacelle. Mounted on the support members for movement axially thereof is a cowling having the same general shape as the thrust housing. More specifically, the forward portion of the cowling is cylindrical and fits around the forward end of the thrust housing in concentric, spaced relation therewith, and the aft end of the cowling branches into a plurality of ejector tubes each disposed in concentric, spaced relation around a respective one of the nozzles of the thrust housing. Screw-type actuators are provided on the nacelle for driving the cowling between a first position wherein the forward edge abuts the aft edge of the nacelle and second position wherein the same edges are spaced apart to thereby permit atmospheric air to flow into the interior of the cowling and through the annular spaces between the ejector tubes thereof and the nozzles of the thrust housing.

OBJECTS OF THE INVENTION

It is accordingly an object of this invention to provide effective means for suppressing the noise of a jet-propelled aircraft at any selected time during its flight, or while the aircraft is on the ground.

Another object of the invention is to provide a method of suppressing the noise of a jet engine of an aircraft and also improving the thrust of said engine during low speed flight of the aircraft while not causing a loss of thrust during cruise flight.

An additional object of the invention is to provide sound suppression apparatus for an aircraft jet engine, which apparatus is simple in construction and arrangement and thus economical to manufacture, operate and maintain.

DESCRIPTION OF THE DRAWINGS

In the drawings.

Throughout the drawings and the following specification, the same numbers refer to the same parts.

DETAILED DESCRIPTION

Figure 2:
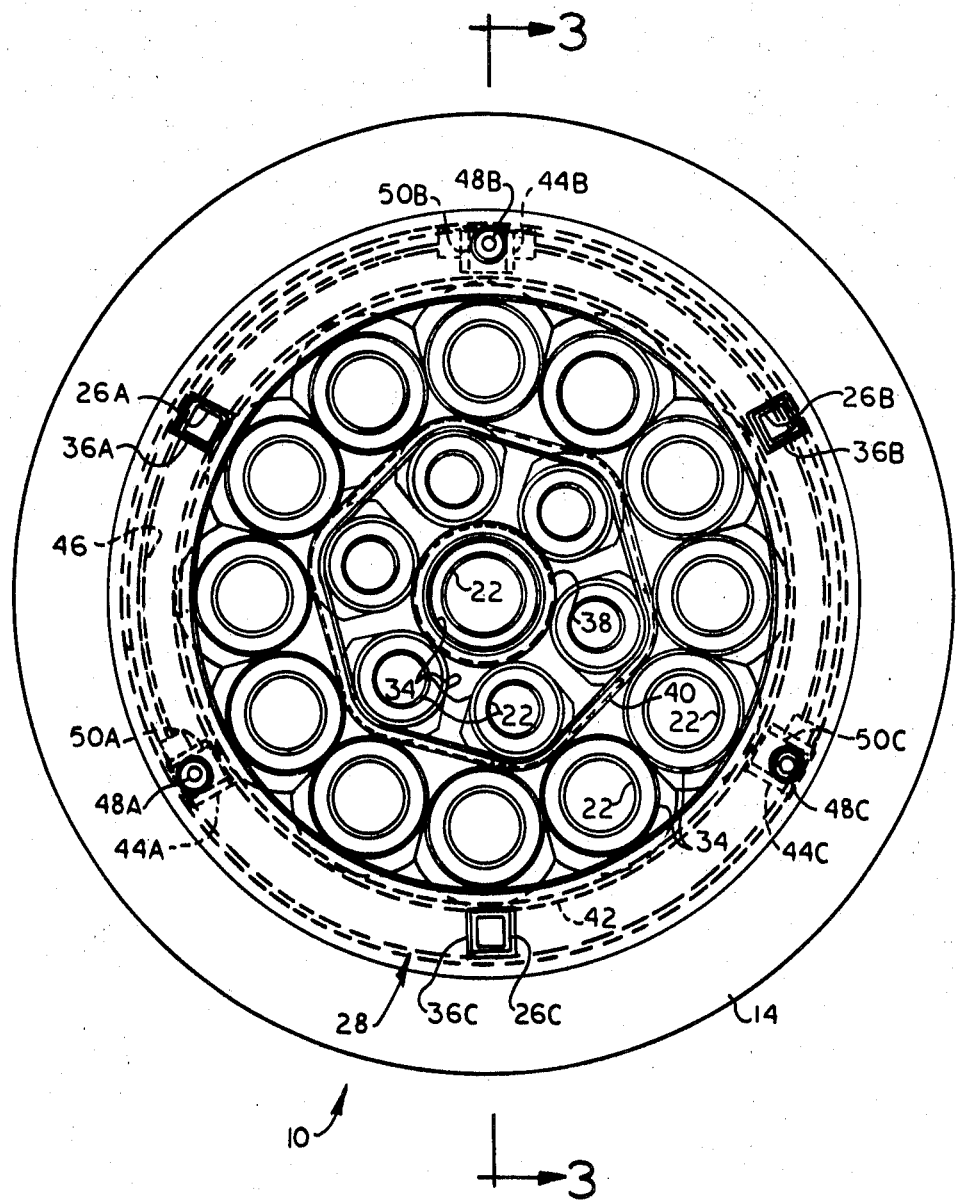
FIG. 2 is an end elevation of the same embodiment, taken along the plane represented by line 2—2 in FIG. 1 and in the direction indicated in the latter drawing.

In the accompanying drawings the number 10 generally designated a nacelle which encloses an aircraft jet engine in conventional manner. An annular rib 12 (see FIGS. 3 and 4) is fixedly connected at the outer, flanged edge thereof to the outer wall 14 of the nacelle, and at the inner edge thereof is connected to the aft end of the tailpipe 16 of the aforesaid jet engine. The forward edge of a thrust housing, generally designated by the number 18, is fixedly joined to the aft edge of tailpipe 16 and includes a substantially cylindrical forward portion 20 and a plurality of tubular nozzles 22 which are joined together at their forward ends by wall sections 24. As can be seen in FIG. 2, one of the nozzles is coaxial with the longitudinal axis of nacelle 10 and the other nozzles are arranged in two sets which encircle the coaxial nozzle.

Three tubular support members 26A—26C are fixedly attached at one end thereof to the rear side of rib 12 and project from the aft end of nacelle 10. The support members are evenly spaced apart circumferentially of rib 12 and have a square cross section, and their longitudinal axes are parallel with the longitudinal axis of the nacelle. A cowling, generally designated in the drawings by the number 28, is formed with a conical forward portion having double walls 30, 32, and with a plurality of tubular ejectors 34 which are integrally joined to said forward portion. More particularly, inner wall 32 of cowling 28 is spaced from the forward portion 20 of thrust housing 18 so as to provide an annular gap therebetween, and ejectors 34 of the cowling are respectively disposed around nozzles 22 and spaced therefrom to provide annular gaps therebetween. Mounting tubes 36A—36C are fixedly positioned in apertures in walls 30 and 32 of the cowling and slidably engage support members 26A—26C, respectively, to thereby mount said cowling on said support members for movement axially thereof. Channels 37 (see FIG. 1) are formed in cowling 28 to provide clearance for support members 26A—26C. Rings 38, 40 are respectively fixedly secured to and disposed between the aft ends of ejectors 34, and another ring 42 is likewise fixedly secured to and disposed between the aft ends of wall 32 and tubes 36A—36C, these rings being provided to increase the rigidity of the cowling.

Mounted on the rear side of rib 12 are three drive motors 44A—44C, which may be of any suitable type and which are connected by a rotatable cable 46 so that screws 48A—48C associated therewith can be rotated simultaneously at the same angular velocity and in the same direction. The drive motors are respectively located between support members 26A—26C, and their screws 48A—48C extend through apertures in wall 32 of cowling 28 and are respectively engaged within threaded apertures in three lugs 50A—50C which are fixedly mounted between said wall 32 and wall 30 of said cowling adjacent the forward end of the latter. Channels 52 (see FIG. 1) are formed in cowling 28 aft of lugs 50A—50C to provide clearance for screws 48A—48C.

OPERATION

Figure 1:
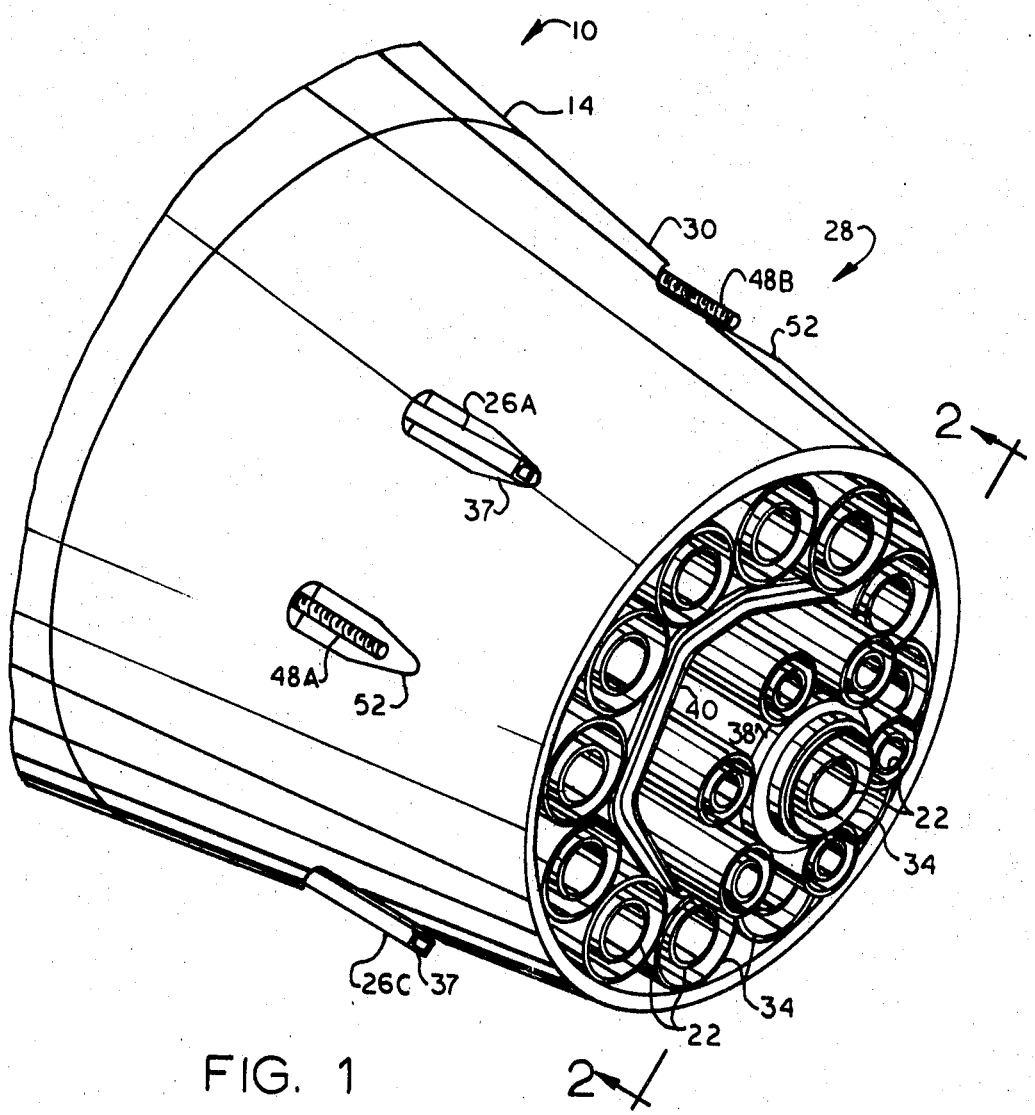
FIG. 1 is a pictorial representation of a preferred embodiment of the invention, the drawing illustrating a portion of an aircraft jet engine nacelle on which components of the sound suppression apparatus are mounted.
Figure 3:
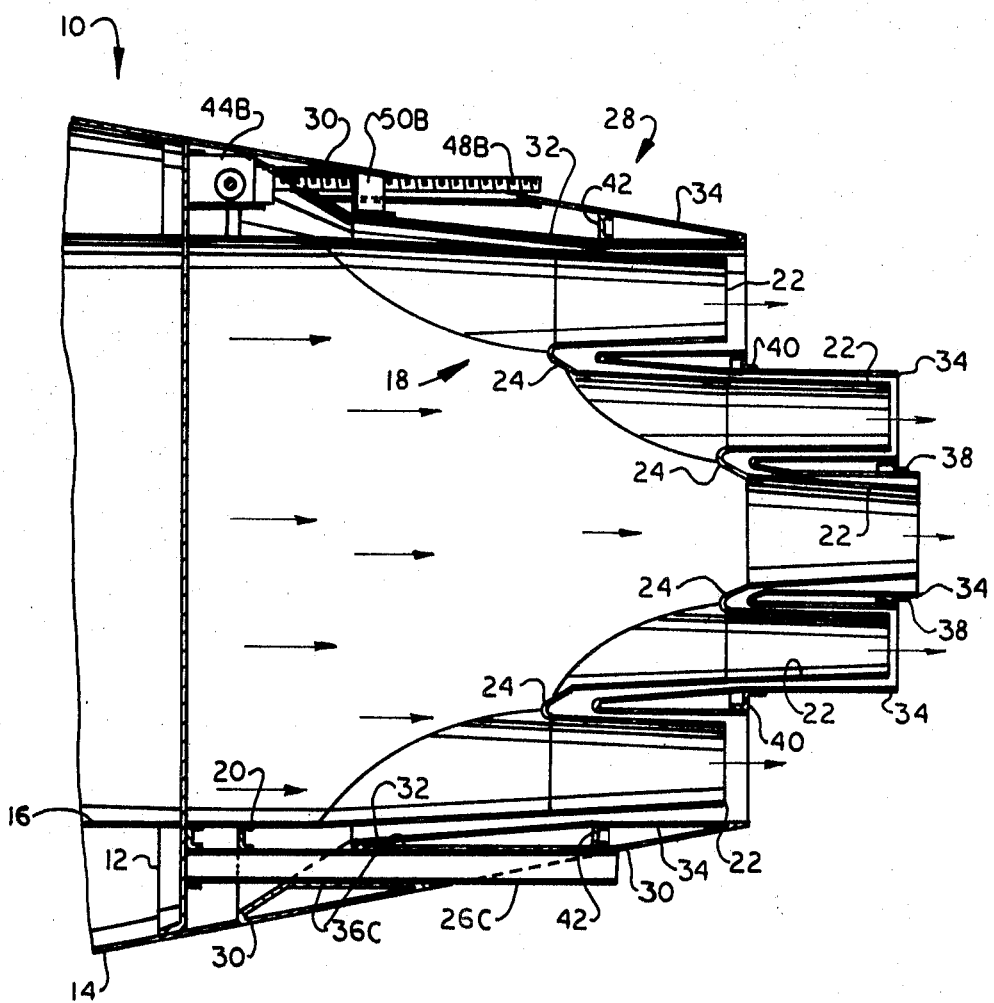
FIG. 3 is a longitudinal section of the same embodiment, taken along the plane represented by line 3—3 in FIG. 2 and in the direction indicated in the latter drawing, the view showing a stowed position of a cowling which constitutes a major component of said embodiment.
Figure 4:
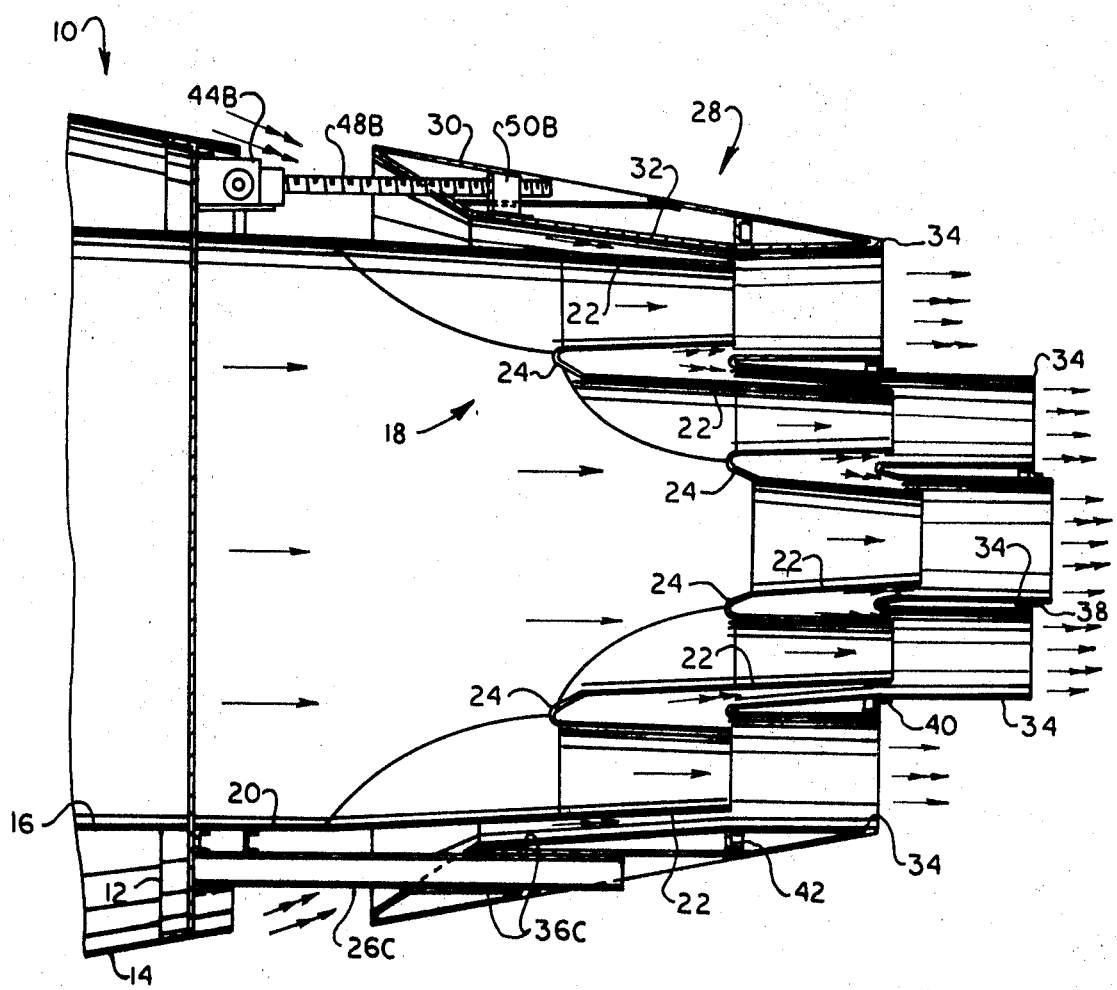
FIG. 4 is a longitudinal section of the same embodiment, taken along the same plane as in FIG. 3 and showing the aforesaid cowling in a deployed or operative position thereof.

When sound suppression is not required for an aircraft equipped with apparatus in accordance with this invention (such as during high altitude flight), cowling 28 is in a first position wherein its forward end matingly abuts the aft end of nacelle 10, as illustrated in FIGS. 1 and 3. To suppress the noise associated with the jet streams issuing from nozzles 22 of thrust housing 18, motors 44A—44C are operated to rotate screws 48A—48C in the direction which moves cowling 28 to the second, or deployed, position which is illustrated in FIG. 4. As illustrated by the double-headed arrows in the last-mentioned drawing, atmospheric air then flows through the annular gap between the aft edge of nacelle 10 and the forward end of cowling 28 and into the interior of the latter. It can be seen in the same drawing that the aft ends of nozzles 22 of thrust housing 18 are adjacent the forward ends of ejector tubes 34 of cowling 28 when the latter is in its deployed position. In FIG. 4 single-headed arrows represent the flow of thrust gas which flows from the jet engine contained in nacelle 10 through nozzles 22 of thrust housing 18. A portion of the air which enters the forward end of cowling 28 flows through the annular gaps between the outermost nozzles 22 and the ejector tubes 34 surrounding these nozzles. A portion of the air also flows through the spaces between nozzles 22 toward the center of cowling 28 and issues from the latter through the annular gaps between the innermost nozzles and ejector tubes associated therewith. Hence the jet streams issuing from all of the nozzles 22 are surrounded by annular streams of air at the ejector tubes 34, which suppresses the noise of said jet streams when they reach the atmosphere aft of said ejector tubes. Obviously cowling 28 can readily be returned to its stowed position against nacelle 10 when suppression of the noise of the aforesaid jet streams is no longer required.

Atmospheric air which is admitted into cowling 28 not only suppresses the noise of the jet engine associated therewith but also augments its thrust. It will also be obvious that motors 44A—44C can be operated to vary the spacing between the aft end of nacelle 10 and the forward end of cowling 28 when the cowling is deployed. Thus the amount of atmospheric air admitted into the cowling can be controlled to optimize thrust augmentation as the speed of the aircraft increases. For static thrust the opening for atmospheric air flow will be maximum; for low speed flight, less air flow will be required; for climb, still less air flow; and for high speed flight the cowling will be closed against the aft end of nacelle 10.

Although the invention has been described with reference to a particular embodiment of the same, it should not be considered to be limited thereto for various modifications could be made therein by one having ordinary skill in the art without departing from the spirit and scope of the invention as defined in the following claims.

I claim:

1. Jet engine apparatus comprising:
a nacelle enclosing a jet engine;
a thrust housing the forward portion of which receives exhaust gas from said jet engine and the aft portion of which defines a plurality of nozzles from which said exhaust gas is discharged;
a cowling surrounding said thrust housing and formed with a plurality of ejector tubes respectively disposed in spaced relation around said nozzles; and
means for selectively admitting atmospheric air into and excluding the same from the interior of said cowling.

2. Jet engine apparatus comprising:
a nacelle enclosing a jet engine;
a thrust housing the forward portion of which receives exhaust gas from said jet engine and the aft portion of which defines a plurality of nozzles from which said thrust gas is discharged;
a cowling surrounding said thrust housing, the forward end of said cowling being annular and adapted to matingly abut the aft end of said nacelle and the aft portion thereof defining a plurality of ejector tubes respectively disposed in spaced relation around said nozzles; and
means for moving said cowling axially of said nacelle between a first position wherein the forward end of said cowling abuts the aft end of said nacelle and a second position wherein the forward end of said cowling is spaced rearwardly of the aft end of said nacelle, whereby atmospheric air can be selectively admitted into and excluded from the interior of said cowling.

3. Jet engine apparatus comprising:
a nacelle enclosing a jet engine;
a thrust housing the forward portion of which is attached to said nacelle and the aft portion of which defines a plurality of nozzles, the forward end of said thrust housing communicating with the tailpipe of said jet engine so that exhaust gas from the latter discharges through said nozzles;
a plurality of elongate support members each of which is fixedly attached at one end to the aft end of said nacelle and extends rearwardly therefrom, said support members being spaced apart externally and circumferentially of said thrust housing and disposed parallel to the longitudinal axis thereof;
a cowling surrounding said thrust housing and mounted on said support members for movement axially of said nacelle, the forward end of said cowling being annular and adapted to matingly abut the aft end of said nacelle and the aft portion thereof defining a plurality of ejector tubes respectively disposed in spaced relation around said thrust nozzles; and
means for moving said cowling axially of said support members between a first position wherein the forward end of said cowling abuts the aft end of said nacelle and a second position wherein the forward end of said cowling is spaced rearwardly of the aft end of said nacelle, whereby atmospheric air can be selectively admitted into and excluded from the interior of said cowling.

4. The apparatus defined in claim 3 wherein said means for moving said cowling comprises at least one screw mounted at the aft end of said nacelle for rotation about its own longitudinal axis and threadedly engaged with said cowling, and means for selectively rotating said screw in opposite directions to thereby move said cowling axially thereof.